June 18, 1929.  H. HANSON  1,717,558
CONNECTING LINK FOR TIRE CHAINS
Filed April 5, 1927
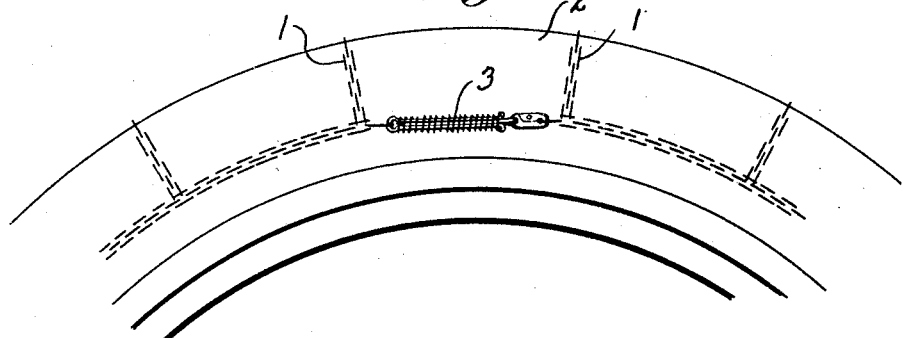
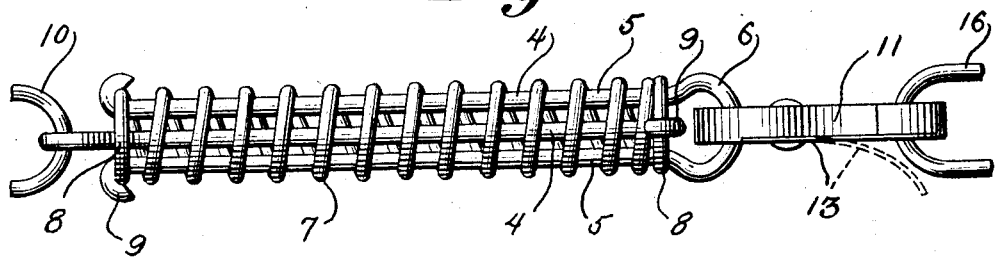
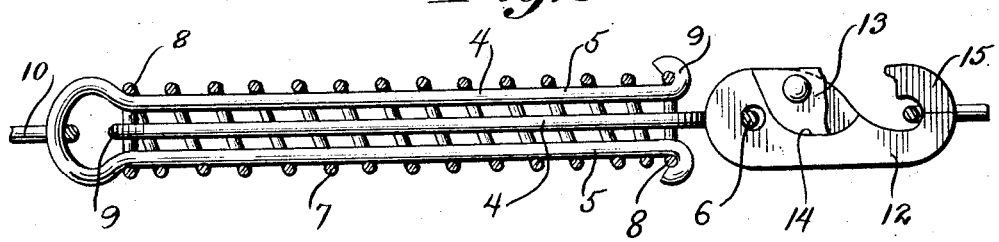
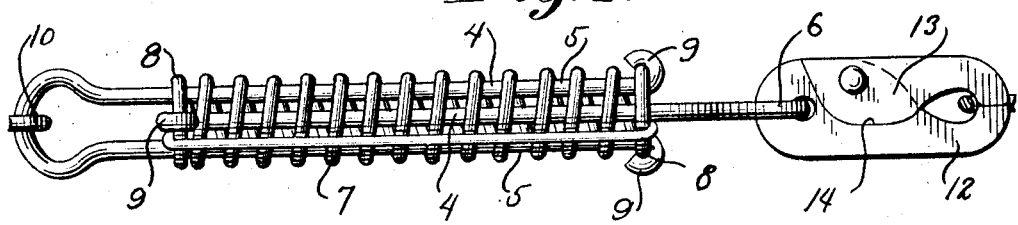
Herman Hanson. INVENTOR.
BY Richard B. Owen
ATTORNEYS.

Patented June 18, 1929.

1,717,558

UNITED STATES PATENT OFFICE.

HERMAN HANSON, OF GARFIELD, MINNESOTA.

CONNECTING LINK FOR TIRE CHAINS.

Application filed April 5, 1927. Serial No. 181,171.

This invention relates to a connecting link for tire chains and has for its primary object the construction of a connector that will hold the chain taut at all times about the tread of the tire and may, at the same time, be readily manipulated to permit of removal of the chain.

With these and other objects in view, my invention will be better understood from a description of the same when taken in connection with the accompanying drawing, wherein:—

Figure 1 is a view illustrating the connecting link of my invention applied to a tire chain;

Figure 2 is a detail plan view of the connector;

Figure 3 is a longitudinal sectional view of the connector;

Figure 4 is a side elevation.

Again referring to the drawing illustrating one of the many constructions of my invention, the numeral 1 designates a plurality of chain sections interconnected in the well known manner and held upon the tire 2 by my improved connector 3.

My improved connector 3 consists of clips 4, comprising parallel limbs 5 and a yoke 6 connecting the limbs together. I provide a coil spring 7 coiled about the limbs and having its ends 8 engaged by hooks 9 formed on the ends of the limbs.

Thus the spring may yieldably take up slack in the tire chain.

The connecting link embodying the invention comprises a flat sided body 11 provided at one end with an opening for the engagement therein of the loop 6 of one of the clips 4 as shown in Figures 2, 3 and 4 of the drawing, and the body is provided at its other end with a hook 12 the bill of which is indicated by the numeral 15 and is engageable by one of the links 16 of the tire chain 1. The hook further embodies a resilient keeper plate 13 which is seated at one end in a recess 14 formed in one side of the body 11 rearwardly of the bill of the hook 12 and secured in place at its said end by a rivet, the said resilient keeper plate having an extension spanning the space between the bill of the hook and that portion of the body of the hook toward which it is presented, and seating flush in a recess 15 formed in the bill 15 of the hook 12 at that side thereof corresponding to the side of the body of the hook in which the recess 14 is formed, it being observed by reference to Figure 2 that the outer side of the keeper plate 13 is flush with or occupies the same plane as the corresponding side or face of the hook body and the bill thereof. Normally the keeper plate assumes the closed position shown in Figure 2 in full lines so as to prevent accidental disengagement of the chain link 16 from the bill of the hook, but, being resilient, it may be sprung laterally as shown in dotted lines in the said figure so as to clear the bill of the hook and permit of engagement of the link 16 therewith, it being understood that after engagement of the link with the hook the member 13 may be released and, through its resiliency, will resume its normal position as shown in Figure 4 in which position it spans the space in rear of the bill of the hook and thus prevents disengagement of the link from the said bill.

I claim:—

1. In a chain connection of the class described, a hook member comprising a flat body portion and a bill, and a locking member comprising a flat-sided, resilient plate disposed against one side of the body portion and the corresponding side of the bill of the hook and having its portion which is disposed against the body portion, secured thereto, its portion which is disposed against the bill of the hook being laterally displaceable, against its resiliency with respect to the bill to permit of engagement of a link or the like with said bill.

2. In a chain connection of the class described, a hook member comprising a flat body portion and a bill, the body portion and bill being each provided in the same side with a recess, and a detent member comprising a flat sided resilient plate disposed at one end flush within the recess in the body of the hook member, means securing the said end of the plate in said recess, the other end portion of the plate normally seating, by its resiliency, flush within the recess in the side of the bill of the hook, and the intermediate portion of the plate spanning the space between the body of the hook and the bill of the hook and constituting means to prevent disengagement of a link from the hook.

3. In a chain connection of the class described, a hook member comprising a flat body portion and a bill constituting an extension of one end thereof, the body portion and bill being each provided in the same side with a recess, the recess in the bill having at its inner end a straight wall extending transversely of the bill and substantially on the longitudinal center line of the hook member and constituting a shoulder, and a detent member comprising a flat-sided resilient plate disposed at one end flush within the recess in the body of the hook member, means securing the said end of the plate in said recess, the other end portion of the plate normally seating, by its resiliency, flush within the recess in the side of the bill of the hook and with its end squarely abutting said shoulder, the intermediate portion of the plate spanning the space between the body of the hook and the bill of the hook and constituting means to prevent disengagement of a link from the hook.

In testimony whereof I affix my signature.

HERMAN HANSON.